United States Patent [11] 3,616,895

| | | | | |
|---|---|---|---|---|
| [72] | Inventors | Roy E. LoPresti<br>Chicago, Ill.;<br>Milan Vojtek, Elmhurst, N.Y.; Edwin A.<br>Peterson, Manhasset, N.Y. | | |
| [21] | Appl. No. | 21,915 | | |
| [22] | Filed | Mar. 23, 1970 | | |
| [45] | Patented | Nov. 2, 1971 | | |
| [73] | Assignee | United Parcel Service General Services Co.<br>New York, N.Y. | | |

[54] CONVEYOR BELT INDEXING MECHANISM
4 Claims, 9 Drawing Figs.
[52] U.S. Cl. .................................................. 198/185,
74/206
[51] Int. Cl. .................................................. B65g 15/00
[50] Field of Search .......................................... 198/135,
203, 181, 185; 74/435, 15.8, 63, 206

[56] References Cited
UNITED STATES PATENTS

| | | | |
|---|---|---|---|
| 3,231,068 | 1/1966 | Harrison et al. ............... | 198/185 |
| 3,291,286 | 12/1966 | Adams ......................... | 198/185 |

Primary Examiner—Evon C. Blunk
Assistant Examiner—H. S. Lane
Attorneys—James Albert Drobile and Robert S. Bramson ABSTRACT: A mechanism for indexing conveyor belts in boxes of carousel-type cargo carriers, comprising a driven shaft slidably and rotatably mounting a resilient-surfaced drive member, which drive member is biased for sliding movement toward one end of the shaft. The drive member, in cross section, has a substantially circular segment of circumference, and at least one substantially flat such segment.

PATENTED NOV 2 1971

INVENTORS.
ROY F. LoPRESTI
MILAN VOJTEK
EDWIN A. PETERSON

BY *Robert Bramson*

ATTORNEY.

INVENTORS.
ROY F. LoPRESTI
MILAN VOJTEK
BY  EDWIN A. PETERSON

Robert S Bramson
ATTORNEY.

CONVEYOR BELT INDEXING MECHANISM

BACKGROUND OF THE INVENTION

1. Field of the Invention

The invention relates to a conveyor belt indexing mechanism, which is adapted for use with a carousel-type cargo-carrying system. In large freight terminals, pieces of cargo are transported from one area of the terminal, where they are unloaded from a truck or railroad freight car, to another area of the terminal, where they are loaded onto another truck or railroad freight car, by means of carousel-type cargo-carrying mechanisms. These carousel-type mechanisms conventionally consist of two or more vertically stacked boxes, the lowermost of which is mounted on wheels; a substantial number of these stacks of boxes are interconnected in a closed loop to transverse a circular or elliptical path. The boxes are driven by overhead drive means, such as an electric motor driving a sprocket which engages a chain to which each stack of boxes is connected. The individual boxes are typically open at their upper and outer faces, and are rather deep, i.e., on the order of 6 or 8 feet, Each such box is often conventionally provided with an endless conveyor belt mounted on its floor and rotated about a pair of shafts, respectively located at opposite ends of the box. One shaft for each box mounts a rotatable indexing wheel, external to the box, which wheel may be rotated to advance or retract the corresponding conveyor belt. The indexing wheels are rotatable, for the purpose of moving cargo from the rear of the box to the front of the box, to facilitate unloading of the box contents.

It is desirable to be able to effect automatic indexing of the conveyor belts in these cargo boxes to facilitate loading and unloading of cargo and to avoid unnecessary use of expensive manpower.

2. Description of the Prior Art

As has been noted, each cargo box of a carousel-type unit is frequently provided with an endless conveyor belt on the floor thereof. Each such conveyor belt is driven by a pair of shafts which are mounted at opposing ends of the box, and one or both of which shafts mounts on external indexing wheel. These indexing wheels may be rotated in a clockwise or counterclockwise direction to advance or retract the conveyor belt within the box, for the purpose of conveying cargo within the box to the rear of the box, if it is desired to use the optimum storage capacity of the box, or to the front of the box, when unloading the box, to provide convenient access to the cargo at the rear end of the box. In the prior art, mechanisms have been provided for indexing these "box belts" for the purpose of facilitating unloading of contents of a box. However, the mechanisms of the prior art have not been useable or adaptable for the purpose of indexing the "box belts" for the loading operation. Thus, there has not heretofore been any device available for automatically indexing box belts to move packages from the forward end of the box to the rear end during the loading operation, nor has there been a device for indexing box belts during both loading and unloading operations.

This invention overcomes the shortcomings of the prior art devices by providing an indexing mechanism which is automatic, and which may be utilized to index the conveyor belts in cargo boxes, so as to insure maximum utilization of available storage space in the boxes during loading. The invention also accomplishes the mechanical advancing of packages in such boxes, to render the packages more accessible for removable.

SUMMARY OF THE INVENTION

This invention is directed to an indexing mechanism, which is particularly suitable for utilization to index conveyor belts in cargo storage boxes of carousel-type cargo-handling systems. Particularly, the conveyor belt drive member of this invention is mounted on a frame at the innner periphery of the travel path of the carousel-type cargo-handling system, and is adapted to sequentially engage and index the indexing wheels for the conveyor belts in the cargo storage boxes of the system. In a carousel-type cargo-handling system utilizing a plurality of stacked cargo boxes, the indexing wheels of the boxes in a given stack can be mechanically interconnected to permit use of a single indexing mechanism to index the conveyor belts in each tier of boxes. Alternatively, a tier of indexing mechanisms can be utilized to index the respective conveyor belts in each tier of cargo boxes.

The indexing mechanism itself comprises a rotatably mounted drive shaft, journaled in a rigidly mounted supporting frame. The shaft is driven by suitable motive power means, is parallel to the direction of movement of the carousel-type conveyor and is substantially coplanar with the axis of the rear shaft upon which a conveyor belt sought to be indexed is mounted. Mounted on the drive shaft, in such a manner as to be able to slide on the shaft while rotating with the shaft, is an indexing drive member which has a resilient drive surface. A substantial portion of the circumference of the drive member is circular, and the drive member contains, along its circumference, at least one substantially flat land section. The drive member is elongated, and is so mounted in relation to the path of movement of the indexing wheels for the respective cargo box conveyors that, when the land portion of the drive member surface is the closest portion of the drive member to the indexing wheel, there is no engagement between the drive member and the indexing wheel, and when the nonland portion of the drive member surface is closest to the indexing wheel, the drive member is in driving engagement with the indexing wheel.

The drive member is also located, with respect to the indexing wheels, so that there is a negative clearance between the curvilinear, nonland portion of the outer surface of the drive member and the engageable surface of the indexing wheel, whereby the indexing wheel, because of the resiliency of the curvilinear portion of the outer surface of the drive member, may become embedded in and deform the drive member to provide substantial friction-type engagement between the drive member and the indexing wheel, and thereby achieve rotation of the indexing wheel by the drive member.

In addition to being slidable upon the drive shaft, the drive member is biased by suitable spring or equivalent means in a direction opposite to the direction of movement of the carousel-type conveyor as it passes the indexing mechanism. The bias of the spring against the drive member is sufficiently small to allow the drive member to advance with the respective indexing wheel which it is engaging on a particular box conveyor belt, in order that the indexing wheel may be continuously driven for an increment of time as the carousel unit is moving. The bias of the spring returns the drive member to its neutral position at the proximal end of the drive shaft upon disengagement of the drive member and indexing wheel. This happens in one of two conditions. The first condition is when the indexing wheel has passed the drive member, and there is no indexing wheel in an engagement position with respect to the drive member. The second condition is when the indexing wheel is opposite the land of the drive member periphery, so that there is a space between the proximal surfaces of the drive member and the indexing wheel, and no engagement can take place. The land on the drive member facilitates the return of the drive member to its position at the proximal end of the drive shaft, and avoids unnecessary damage to the resilient outer surfaces of the drive member.

The drive member is provided with chamfered forward and trailing edges, in order that the indexing wheel, as it engages the drive member, accomplishes the engagement gradually, thereby avoiding unnecessary damage to the resilient surface to the drive member.

The resilient surface of the drive member, and the bias of the drive member on the drive shaft, are also important to accomplish an additional purpose, which is to accommodate dimensional differences between successive boxes of a carousel-type unit. Respective indexing wheels on different boxes of a carousel-type unit may be somewhat differently located with respect to the drive member, and their longitudinal spacing can vary from box to box. By providing a resilient surface on the drive member and providing for translational movement of the drive member, the drive member is able to accommodate these differences in indexing wheel locations.

Inasmuch as carousel-type conveyors conventionally have tiers of two or more boxes, and each box in a tier can contain a box conveyor belt, the proper functioning of an indexing mechanism will accomplish the indexing of the conveyor belt of each of the boxes in a tier. This may be achieved by providing a tier of indexing mechanisms, one corresponding to each box indexing wheel in the tier, and driven by the same drive motor through a drive chain or the like, or alternatively by providing a single indexing mechanism, and interconnecting the conveyor belt drive shafts in each tier by a suitable sprocket chain or belt mechanism.

In operation, the indexing wheel for a conveyor belt of a carousel-type system box rides up on the tapered leading edge of the drive member and becomes embedded in the resilient curvilinear drive surface of the drive member. The drive member is constantly rotated by the shaft upon which it is mounted, and during engagement of the drive member and indexing wheel this rotation is transmitted to the drive wheel. When the drive member is in such a position that the surface of the drive member most proximate the indexing wheel is a land, there will be no engagement between the drive member and the indexing wheel, and the drive member is biased to its rest position at one end of the drive shaft. During the engagement of the drive member and the indexing wheel, the drive member translates along the drive shaft, as it rotates with the movement of the drive wheel, although some slippage can exist. The same indexing wheel may be reengaged by the drive member in a single cycle of the carousel and further rotated to index its belt, or a succeeding indexing wheel can be engaged after the disengagement of the preceding indexing wheel. The number of engagements between the drive member and any indexing wheel in a single cycle of rotation of the carousel can be varied, by regulating the length of the drive member, the diameter of the drive member, the peripheral extent of the nonengaging land portion or portions of the drive member surface, the speed of rotation of the drive member, or the speed of translation of the carousel unit, or a combination of these.

It may be desired to effect a plurality of incremental advances of the conveyor belt in each box in a carousel-type unit, in a single cycle of rotation of the carousel. In that event, such incremental advances could be accomplished by the use of several conveyor belt indexing mechanisms of this invention, spaced along the conveyor travel path. The particular location of the indexing units could be modified in accordance with the cargo box loading pattern utilized in the carousel conveyor system.

The indexing mechanism of this invention therefore provides a simple, relatively inexpensive, conveniently adjustable unit for indexing the conveyor belts in the storage boxes of carousel-types of cargo manipulating systems. The device of the invention is also sufficiently flexible to accommodate reasonable deviations in spacing and dimensions between successive boxes, and consequently successive indexing wheels, and their respective locations with respect to the drive member.

OBJECTS OF THIS INVENTION

It is therefore an object of this invention to provide a box belt indexing mechanism, which is adaptable for use with carousel-type cargo conveying systems, for indexing box conveyor belts in either of two directions loading or unloading.

Another object of this invention is to provide a versatile box belt indexing mechanism, which can accommodate the variations in dimension and location of cargo boxes and conveyor belt indexing wheels in a carousel-type cargo carrying device.

DESCRIPTION OF THE PREFERRED EMBODIMENT

Figure 1:
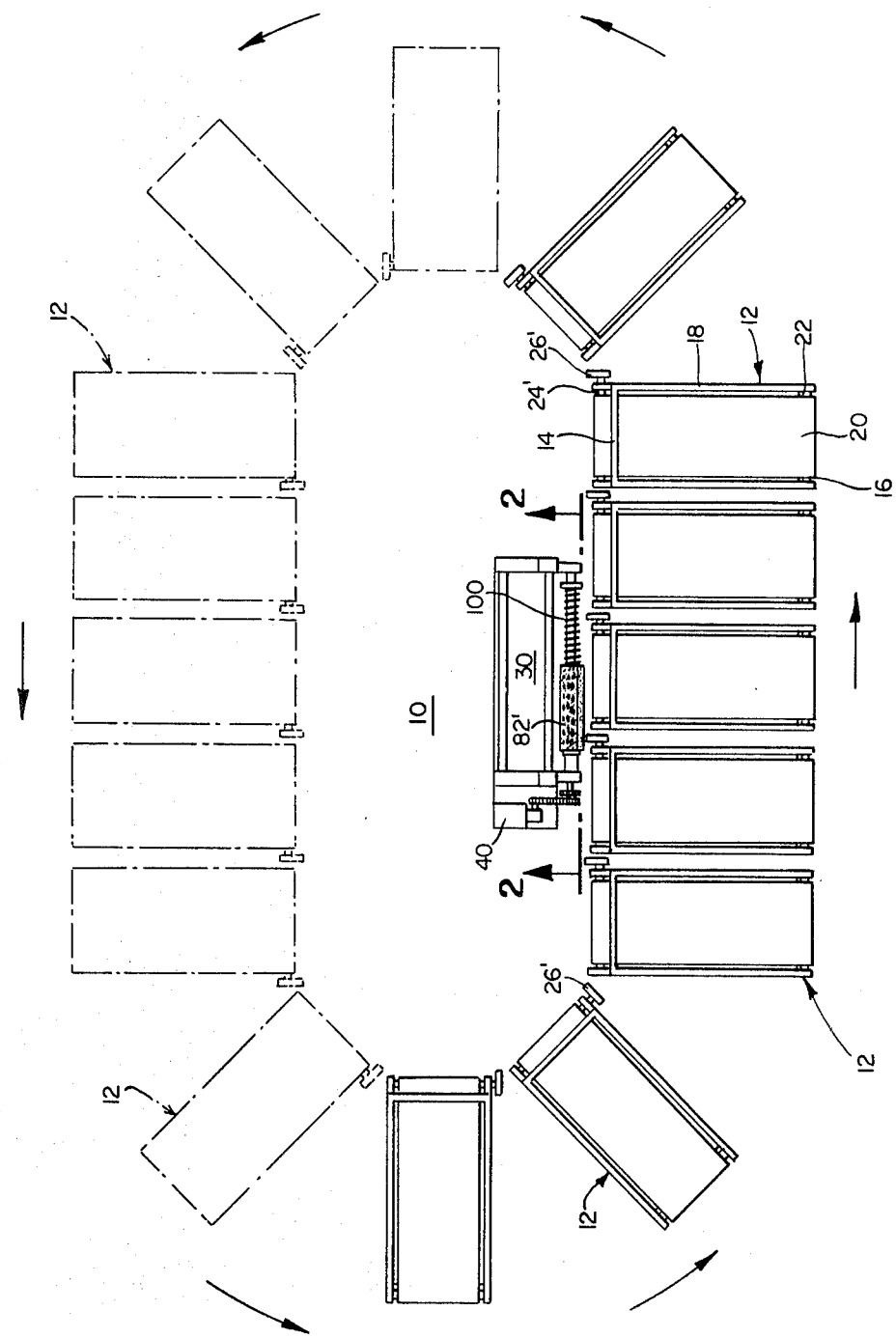
FIG. 1 is a top plan view of a schematic representation of a conventional carousel-type cargo conveying system, and a box conveyor belt indexing mechanism in accordance with this invention.

Looking at FIG. 1, there is schematically illustrated a conventional carousel-type cargo conveying system 10. The system 10 comprises a multiplicity of cargo-carrying boxes 12, which are interconnected, and are driven by suitable motive power means. The boxes are conventionally mounted in tiers, and the lowest box in each tier is mounted on wheels. The motive power means is conventionally mounted above the boxes, driving an endless chain which rotates in a elliptical path, and which chain is attached to each box or tier of boxes so that the boxes continuously rotate in an elliptical path. The direction of rotation of the boxes is illustrated by the arrows in FIG. 1. Carousel-type conveyors of this sort are well known in the art, and the particular details of the carousel unit itself forms no part of the invention.

Each of the boxes 12 is formed by a pair of sidewalls 18, a rear wall 14, and an open front face 16. Journaled in the forward and rear ends of the boxes are rotatable forward shaft 22 and rear shaft 24 upon which conveyor belt 20 is rotatably mounted. Rear shaft 24 is located behind the rear wall 14 of box 12, and supports an indexing wheel 26 which extends in front of the sidewall 18 of box 12. Indexing wheel 26 is rigidly mounted on shaft 24 so that conveyor belt 20, which extends through a suitable aperture in rear wall 14, is moved with the rotation of the wheel 26. The indexing wheel 26 functions to advance or reverse the upper surface of the conveyor belt. When the conveyor belt is advanced, packages placed at the front end 16 of box 12 are moved to the back of the box, to make room for the loading of more packages on the front end of the box. Too, when the box is being unloaded, reverse rotation of indexing wheel 26 reverses the direction of movement of the conveyor belt, to move cargo from the rear end 14 of the box to the forward end 16 of the box, in order to facilitate unloading of packages from the box.

Figure 3:
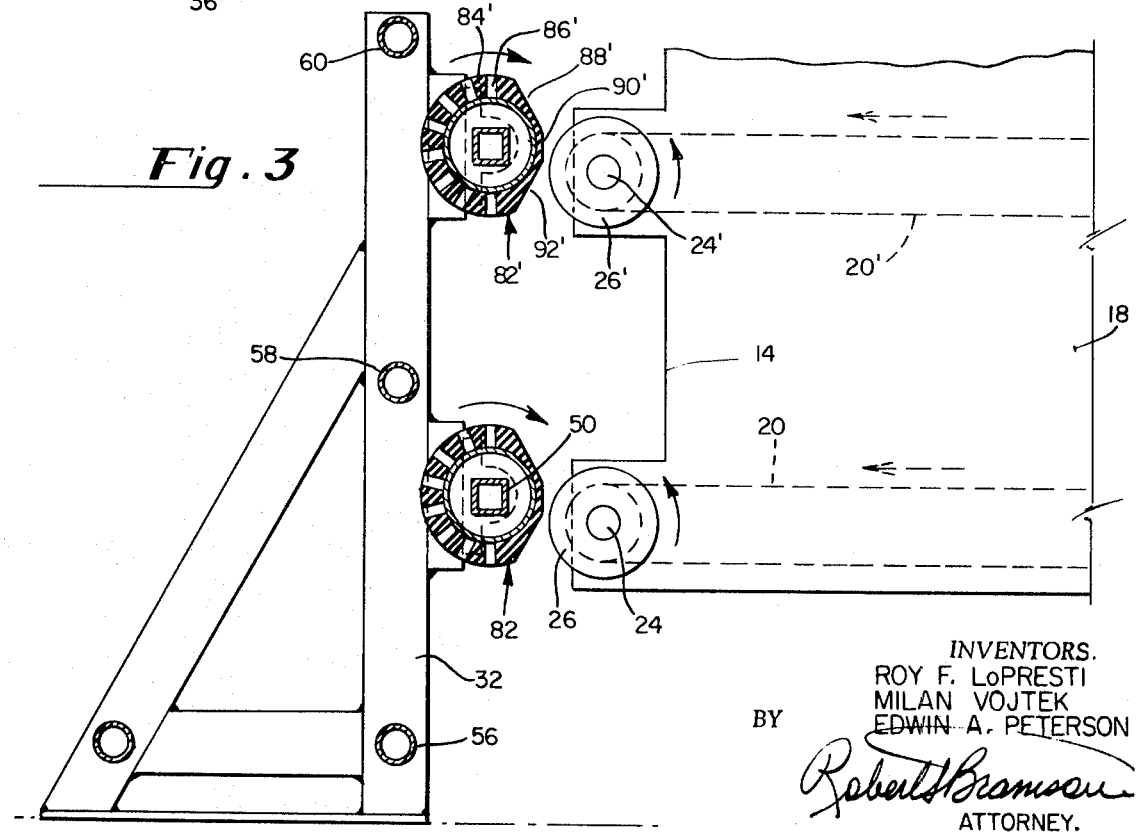
FIG. 3 is a cross-sectional view taken along line 3—3 of FIG. 2, and showing in partial side elevation the indexing wheels of a tier of cargo boxes.
Figure 4:
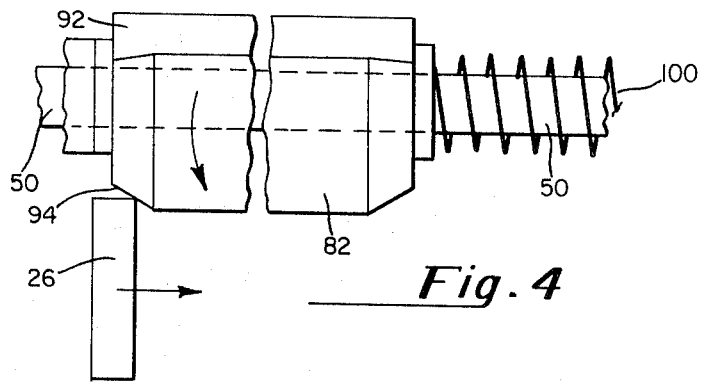
FIG. 4 is a schematic representation of the indexing member of this invention in a position prior to engagement of the indexing wheel of a box conveyor.

As can be seen in FIG. 3, the boxes can be arranged in tiers of two or more boxes, in order to permit more efficient utilization of the available space and equipment. In that event, the indexing mechanism of the invention can be adapted for indexing a plurality of conveyors in a vertical stack of boxes, by employing two or more indexing units, or by operatively connecting all of the conveyor belts in a tier by a chain drive or the like, and utilizing a single indexing mechanism.

Figure 2:
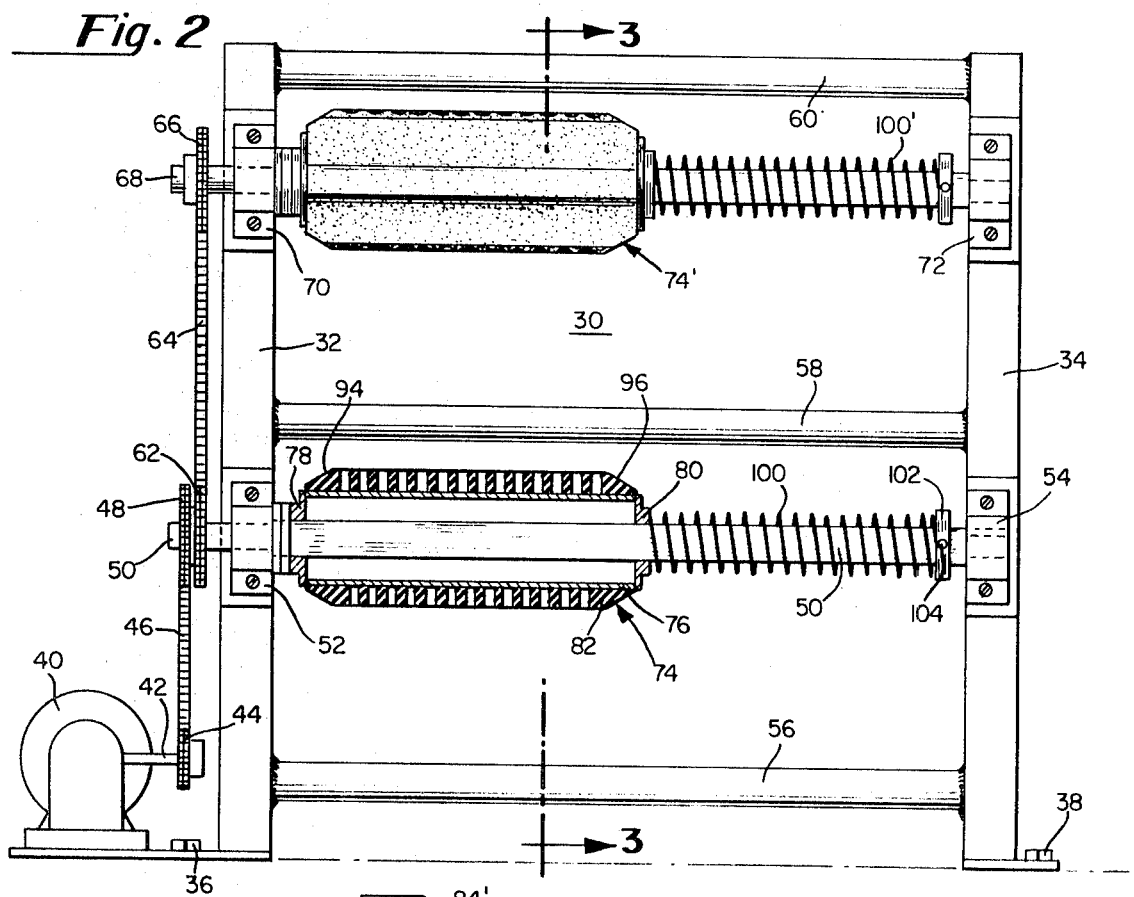
FIG. 2 is a partial cross-sectional view of the indexing mechanism, taken along line 2—2 of FIG. 1.

As best seen in FIGS. 2 and 3, the indexing mechanism 30 is comprised of a pair of A-shaped frame members 32 and 34, formed of structural steel or similar materials, and bolted or similarly rigidly fastened to the floor, such as by suitable bolts 36 and 38. Mounted in the floor, alongside the supporting frame number 32, is an electric motor 40, which may be a constant speed or variable speed motor, according to the degree of adaptability desired in the apparatus; the purpose of the motor is to effect rotation of the indexing mechanism. The motor 40 has an output shaft 42 on which is rigidly mounted a sprocket member 44 which drives a conventional drive chain 46. The other end of the drive chain 46 is mounted on a sprocket member 48; sprocket 48 is mounted on a shaft 50. Shaft 50 is mounted in suitable journal members 52 and 54, and the journal members 52 and 54 are respectively rigidly fastened to frame members 32 and 34. Journal members 52 and 54 contain suitable bearings (not shown) to facilitate rotation of shaft 50.

Frame members 32 and 34 are interconnected by rigid structural crossmembers 56, 58 and 60 to provide a total supporting unit which is structurally rigid, and is capable of withstanding substantial impact forces.

As seen in FIG. 3, shaft 50 is of square cross section intermediate the journals, although this intermediate section may be of other suitable noncircular cross section. The ends of the shaft are round, to rotate in the journals, although the entire shaft could be of noncircular cross section, with the journaled portion mounted in a circular collar. In order to conserve material and limit weight, the shaft is preferably hollow, but is sufficiently strong to withstand the substantial impact forces to which the shaft is subjected during the normal operation of the indexing mechanism.

As seen in FIGS. 2 and 3, the supporting frame supports a pair of conveyor belt indexing members, in order to accomplish indexing of the conveyor belts of the two stacked boxes shown in FIG. 3. For the purpose of indexing upper conveyor belt 20, shaft 50 rigidly mounts a second sprocket 62, which drives an endless chain 64. The other end of the chain 64 is mounted on sprocket 66. Sprocket 66 is, in turn, rigidly mounted on shaft 68. Shaft 68 is journaled between the two A-frame members, for rotation therein. The upper journal members are respectively designated 70 and 72. Journal members 70 and 72 are provided with suitable bearings (not shown) to permit convenient rotation of shaft 68 therein. The journaled portions of the shaft 68, if they are noncircular, are provided with suitable circular collars, rigidly connected thereto. The collars, mounted in the respective journal members, permit rotation of the noncircular shaft 68 therein.

Mounted on shaft 50, in such a manner as to be rotatable therewith and slidable thereon, is indexing member 74. Indexing drive member 74 comprises an elongated, rigid cylindrical support member 76, which has end closure members 78 and 80 rigidly fastened thereto. Each of the end closure members 78 and 80 has a square aperture therein, which is complementary to shaft 50, so that the members 76, 78 and 80 form a single, rigid unit, which is rotatable with the drive shaft 50 because of the close fit between the drive shaft and the apertures in end members 78 and 80, and which is slideable on shaft 50, because no provision is made for fixing the end members 78 and 80 in the shaft 50 to prevent longitudinal movement of the indexing drive members.

Rigidly mounted on cylindrical member 76 is a flexible rubber sleeve 82, which has a circular peripheral portion 84, containing a multiplicity of apertures 86 extending therethrough and located about the circumference of the circular portion, and along the length thereof. Also present on the circumference of rubber sleeve 82 are three elongated, flat land sections, respectively designated 88, 90 and 92, all three of which occupy somewhat less then 50 percent of the circumference of the sleeve 82.

Each end of sleeve 82 has a bevelled end face, respectively designated at 94 and 96. The bevel is at an angle of approximately 30° from the axis of shaft 50.

In one embodiment of the invention, the rubber sleeve 82 has an outside diameter of 12 inches, and the distance from the center to flat section 90 is approximately 4¾ inches. Circular section 84 of the rubber sleeve preferably occupies approximately two-thirds of the total periphery of the sleeve 82.

Also mounted on shaft 50 is compression spring 100, one end of which bears upon end cap 80 of the indexing mechanism, and the other end of which bears against collar 102 which is rigidly, adjustably mounted on shaft 50 by means of set screw 104, so that collar 102 rotates with the shaft. By adjusting set screw 104, collar 102 can be slid along the shaft and locked in various position along the shaft, to regulate the degree of compression of spring 100, and thereby to vary the spring force which urges drive member 74 toward the proximal end of the drive shaft 50. In a preferred embodiment of the invention, spring 100 is made of ⅜-inch diameter coiled, wound spring wire, having a spring constant of 12.5 pounds per inch, an outside diameter of 5 inches, an inside diameter of 4½ inches, a free length of 24 inches from end to end, and containing approximately 18 complete spring coils. The purpose of the spring 100 is to maintain a force against drive member 74, to bias drive member 74 toward its equilibrium position at the proximal end of shaft 50, in order to return the drive member to that equilibrium position when the drive member 74 disengages an indexing wheel 26.

Figure 5:
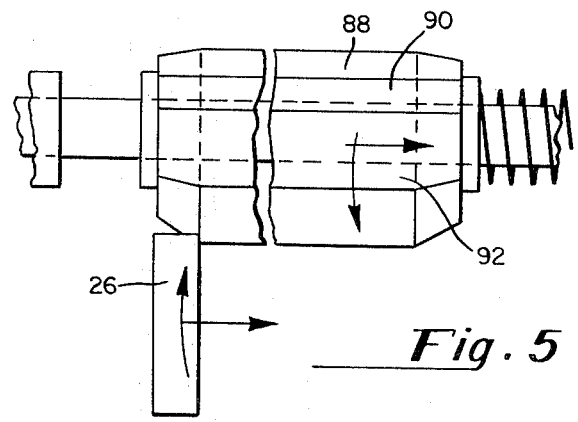
FIG. 5 is a schematic representation, similar to FIG. 4, of the indexing member of this invention shortly after driving engagement with the indexing wheel of a box conveyor commences.

Referring to FIGS. 3 to 7 inclusive, the operation of the indexing mechanism of this invention will be explained. The carousel-type cargo-carrying unit is usually driven at a relatively constant linear speed, which may conventionally be 80 feet per minute. Typically, shafts 50 and 68 will be driven by motor 40 at constant rotating speeds of 60 revolutions per minute. Viewing FIG. 4, indexing wheel 26 of a cargo box 12 is moving in a linear direction at 80 feet per minute, and initially comes in contact with the bevelled leading edge 94 of drive member 74, which is rotating at a speed of 60 revolutions per minute; the drive member 74 is shown in the proximal equilibrium position on drive shaft 50, and is maintained in that position by spring 100. As indexing wheel 26 moves forward with the forward movement of the box 12 on which it is mounted, it commences to engage the cylindrical portion 84 of the rubber cover 82 on the drive member and with the engagement, indexing wheel 26 commences to rotate with the rotating rubber sheath 82. Also, due to the frictional engagement between the indexing wheel and section 84 of the rubber sheath, the indexing wheel 26 slides drive member 74 along drive shaft 50, thereby compressing spring 100, and increasing the spring force exerted on drive member 74, biasing it toward its equilibrium position at the proximal end of the drive shaft 50. FIG. 5 illustrates this engaged position, the indexing member having been moved along shaft 50. As the box 12, its indexing wheel 26, and the drive member 74 continue to travel, the indexing wheel is rotated an angle approximately equal to the angle of its engagement with the rubber sheath. As the indexing when is then rotated, the conveyor belt 20 is driven a proportional linear distance.

Figure 7:
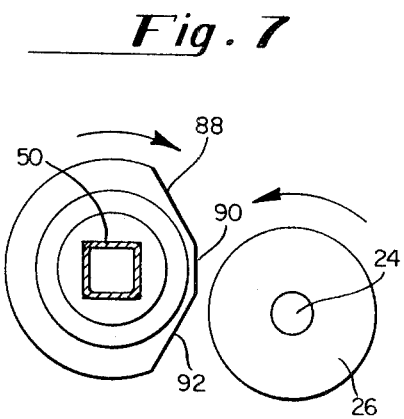
FIG. 7 is a cross-sectional view taken along line 7—7 of FIG. 6.
Figure 6:
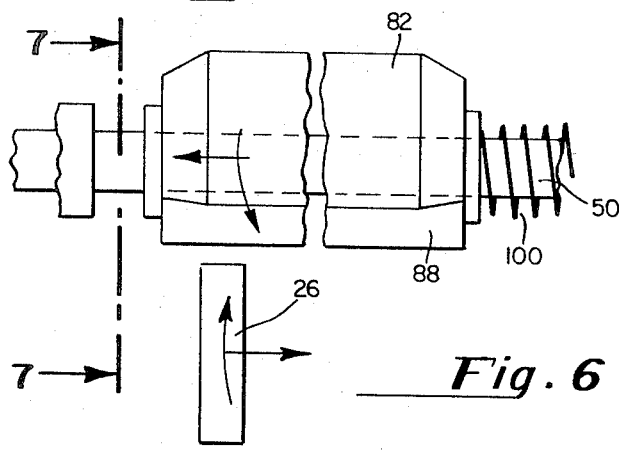
FIG. 6 is a schematic representation, similar to FIG. 4, showing the indexing member of this invention after if has disengaged the indexing wheel, and prior ro being completely returned to its equilibrium position on the drive shaft.
Figure 9:
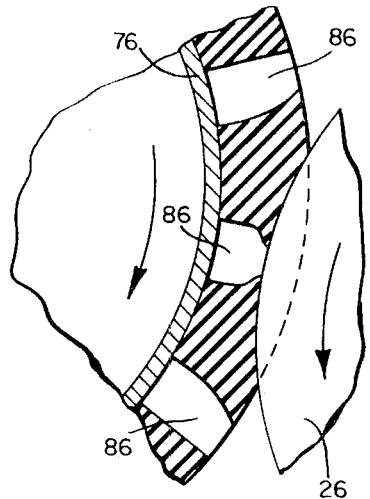
FIG. 9 is a partial cross-sectional view, taken along line 9—9 of FIG. 8.
Figure 8:
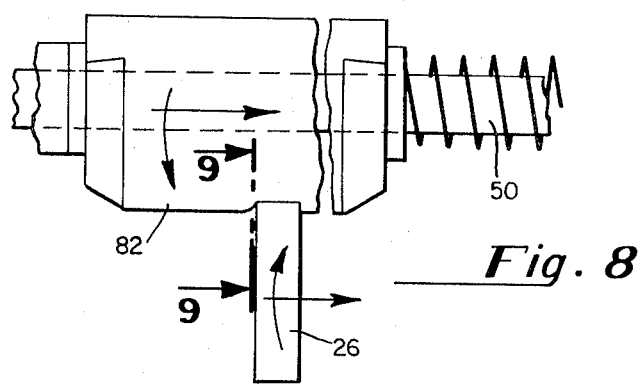
FIG. 8 is a schematic representation, similar to FIG. 4, showing the indexing member of this invention after it has resumed engagement with the indexing wheel.

After the indexing wheel 26 has entered into substantial engagement with the circular portion 84 of rubber sleeve 82, and the indexing wheel has been rotated therewith, the rubber sleeve 82 rotates to a position, such as illustrated in FIGS. 6 and 7, in which one of the flat faces 88 or 92 is most proximate to the indexing wheel 26, so that there is no engagement between the drive member 74 and the indexing wheel 26. In this position, there is no force to resist the biasing force of spring 100, and spring 100 returns the drive member 74 to its equilibrium position at the proximal end of drive shaft 50. As seen in FIGS. 8 and 9, after the drive member 74 has been returned by spring 100 to its equilibrium position, the cargo box has continued its travel so that indexing wheel 26 has translated further with respect to the drive shaft 50, and after the final flat 88 has rotated away from its position most proximate to the drive wheel 26 (see FIG. 7), the indexing wheel may again be engaged by the circular portion 84 of the rubber cover 82 and is rotated thereby. As can be seen in FIGS. 8 and 9, the circular portion 84 of the sleeve 82 is distorted during engagement with indexing wheel 26, thereby providing a positive frictional drive between the drive member 74 and the indexing wheel 26, further rotating the indexing wheel, and consequently further indexing the conveyor belt 20. As best seen in FIG. 9, the rubber sheath 82 most readily distorts in the area of the apertures 86; the purpose of providing apertures 86 is to facilitate distortion of the rubber roller to permit good driving engagement of the roller with the indexing wheel 26. The rubber sheath is preferably formed of a relatively hard rubber, in order to provide for relatively long life of the rubber cover which is subjected to substantial impact and abrasion in use.

During the course of a single passage of an indexing wheel past the indexing mechanism station, the indexing mechanism will engage the indexing wheel approximately two or three times. The conveyor belt in each cargo box will thus be indexed a distance of up to about 3 feet with each cycle of operation past one indexing station. The 3 feet indexing distance is an optimum distance for indexing each conveyor belt. The specific amount of indexing achieved can be controlled by regulating, for example, the speed of rotation of the indexing mechanism, the respective diameters of the drive member and the indexing wheel, the conversion ratio between the indexing wheel and the conveyor belt support shaft, the speed of translation of the carousel unit, the amount of slippage that takes place between the rubber cover and the indexing wheel, the particular point in the cycle at which the indexing wheel engages the drive member, and the length of the drive member.

Referring to FIGS. 2 and 3, it will be appreciated that the drive member 74', at the upper portion of the frame, will engage and rotate indexing wheel 26' of the second box in each tier, in the same manner as the drive member 74 below it engages indexing wheel 26. All of the elements of the upper drive member 74' correspond directly to the unprimed elements of drive member 74.

In a carousel unit containing three or four or more boxes in a vertical tier, the indexing unit frame can be provided with an appropriate corresponding number of indexing mechanisms. Alternatively and preferably, a single indexing mechanism can be provided, and a chain and sprocket device mounted on the bottom cargo box conveyor belt indexing wheel and connected to the shafts of the other indexing wheels, to provide for indexing of all of the indexing wheels in a single tier, in response to positive engagement and drive between a single indexing wheel in a stack and a single drive member which is driven and mounted on the frame.

It will be appreciated that more than one indexing mechanism can be mounted with respect to a carousel-type unit, the number of indexing mechanisms utilized depending upon the amount of the indexing desired, and the particular location of the indexing in relation to the cycle of operation of the cargo unit. For example, the cargo unit may have a series of loading stations and a single unloading station, in which event it may be desired to provide for indexing of the conveyor belts in each tier of cargo boxes immediately after the tier of boxes passes each or several of the respective loading stations.

It will be appreciated that by reversing the direction of rotation of the drive shafts 50 and 50' the direction of rotation of the corresponding drive wheels will likewise be reversed, if the direction of movement of the carousel unit is unchanged. Therefore, by making the motor 40 reversible, the indexing mechanism of the invention can be utilized to move cargo from the rear of each cargo box, toward the front of the box, to facilitate unloading of the boxes. Since the cargo boxes are illustrated as being without any front, indiscriminate indexing of the conveyor belts in the unloading direction could accidentally discharge cargo on the conveyor belts off the front of the cargo boxes. This problem can readily be avoided by providing a suitable cross member mounted between the sides of the box, slightly above the upper surface of the conveyor belt, at the open end of each box. In that way, by merely providing a reversible motor 40 and a stop member, the indexing mechanism of the invention may be utilized for loading and for unloading cargo.

Because loading and unloading of the boxes in a carousel-type system occurs at the outer periphery of the carousel travel loop, it is preferred to place the indexing mechanism on the inner periphery thereof, so that its bulk will not interfere with the loading or unloading operation. However, if desired, the indexing mechanism can be placed on the outer periphery of the carousel unit, with an appropriate reversal of the elements of the indexing mechanism illustrated, so that they are allochiral in comparison with the unit shown in FIG. 1.

It will be appreciated that a substantial number of departures from the specific embodiment disclosed herein can be made without departing from the spirit and scope of the invention. For example, rather than making holes 86 in the rubber sleeve 82 of the indexing mechanism, the elasticity of the rubber sleeve can be chosen to be sufficient to provide for ready distortion of the rubber sleeve. Too, it is not necessary to provide three flat surfaces 88, 90 and 92 on the periphery of the rubber sleeve 82; rather, one or two such surfaces may be provided, to permit convenient transition from engagement to disengagement, when the indexing wheel and drive member are in the appropriate engaging and disengaging position.

We claim:

1. A conveyor belt indexing mechanism for use with carousel-type cargo carriers, comprising: a rigidly mounted frame, an elongated shaft rotatably mounted on said frame, a drive member rotatably and slidably mounted on said shaft, said drive member having a resilient outer surface section of substantially constant radius and having a land portion, said resilient outer surface being adapted to drivingly engage an indexing wheel of a carousel-type cargo box, spring means mounted on said shaft and biasing said drive member toward one end of said shaft, and drive means to rotate said shaft, whereby said resilient outer surface section can engage the indexing wheel of an adjacent, moving cargo box and rotate the same to index a conveyor belt driven by said wheel and said drive member translates along said shaft in driving engagement with said wheel and subsequently disengages said wheel and returns to its equilibrium position at an end of said shaft.

2. An apparatus as set forth in claim 1, wherein said drive member has three outer land portions occupying approximately one-third of its circumference.

3. A conveyor belt indexing mechanism for use with a carousel-type cargo carrier, comprising: a rigidly mounted frame, a drive shaft rotatably mounted on said frame, drive means operatively connected to said drive shaft, an elongated drive member rotatably, slidably mounted on said drive shaft, said drive member having a resilient sleeve, said sleeve having an inclined leading edge and in cross section having a circular segment occupying at least one-half of the circumference of said sleeve and at lease substantially planar land, and spring means biasing said drive member toward the proximal end of said shaft.

4. An indexing mechanism as set forth in claim 3 wherein the circular segment of the sleeve occupies about two-thirds of the circumference of the sleeve, and the remainder is occupied by three substantially equal lands, said sleeve being formed of hard rubber.

* * * * *